(12) United States Patent
Pauli et al.

(10) Patent No.: US 10,968,984 B2
(45) Date of Patent: Apr. 6, 2021

(54) TRANSMISSION ARRANGEMENT WHICH CAN BE SHIFTED UNDER FULL LOAD, AND AGRICULTURAL WORKING MACHINE

(71) Applicant: ZF Friedrichshafen AG, Friedrichshafen (DE)

(72) Inventors: Thomas Pauli, Tiefenbach (DE); Stefan Igl, Vilshofen (DE); Thomas Oberbuchner, Passau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 766 days.

(21) Appl. No.: 15/565,935

(22) PCT Filed: Mar. 14, 2016

(86) PCT No.: PCT/EP2016/055423
§ 371 (c)(1),
(2) Date: Oct. 12, 2017

(87) PCT Pub. No.: WO2016/165891
PCT Pub. Date: Oct. 20, 2016

(65) Prior Publication Data
US 2018/0058549 A1   Mar. 1, 2018

(30) Foreign Application Priority Data

Apr. 16, 2015 (DE) .................. 10 2015 206 881.1

(51) Int. Cl.
*F16H 3/093* (2006.01)
*F16H 3/00* (2006.01)
(Continued)

(52) U.S. Cl.
CPC ........... *F16H 3/093* (2013.01); *F16H 37/043* (2013.01); *F16H 3/006* (2013.01); *F16H 3/091* (2013.01); *F16H 2003/0818* (2013.01)

(58) Field of Classification Search
CPC ........ F16H 3/093; F16H 37/043; F16H 3/006; F16H 3/091; F16H 2003/0818
(Continued)

(56) References Cited

U.S. PATENT DOCUMENTS 4,244,232 A * 1/1981 Murayama ............. B60K 17/28
74/15.66
6,742,829 B2   6/2004 Reihl
(Continued)

FOREIGN PATENT DOCUMENTS

DE    26 45 907 A1    4/1978
DE    102 31 838 A1   2/2004
(Continued)

OTHER PUBLICATIONS

See German Search Report Corresponding to 10 2015 206 881.1 dated Jun. 20, 2016.
(Continued)

*Primary Examiner* — Ha Dinh Ho
(74) *Attorney, Agent, or Firm* — Davis & Bujold PLLC; Michael J. Bujold

(57) ABSTRACT

A transmission arrangement (1) for a vehicle, such as an agricultural working machine, that can be shifted under full load, including a plurality of torque-transmitting branches formed, on the drive input side, by alternatively shiftable gear stages of a splitter transmission (2) and, on the drive output side, by alternatively shiftable gear stages of a synchromesh transmission (3), so that each torque-transmitting branch is defined by engaging a gear of the splitter transmission (2) and by engaging a gear of the synchromesh transmission (3). The synchromesh transmission (3) has two input shafts (9, 10), each respectively in driving association with a powershiftable element (4, 5). The splitter transmission (2) is designed as a powershiftable splitter transmission
(Continued)

(2) and the powershiftable elements (4, 5) are arranged in the force flow direction, after the splitter transmission (2) but before the synchromesh transmission (3).

16 Claims, 5 Drawing Sheets

(51) Int. Cl.
  *F16H 3/091* (2006.01)
  *F16H 3/08* (2006.01)
  *F16H 37/04* (2006.01)
(58) Field of Classification Search
  USPC .......................................... 74/330, 331, 339
  See application file for complete search history.

(56) References Cited

U.S. PATENT DOCUMENTS

| | | | |
|---|---|---|---|
| 8,051,732 B2 | 11/2011 | Gitt | |
| 8,166,842 B2* | 5/2012 | Rieger | F16H 3/006 |
| | | | 74/330 |
| 8,578,801 B2 | 11/2013 | Gumpoltsberger et al. | |
| 9,145,959 B2 | 9/2015 | Otten | |
| 2007/0277633 A1* | 12/2007 | Burgardt | F16H 3/093 |
| | | | 74/331 |
| 2009/0017957 A1* | 1/2009 | Triller | F16H 37/0846 |
| | | | 475/207 |
| 2009/0173175 A1* | 7/2009 | Thery | F16H 3/006 |
| | | | 74/331 |

FOREIGN PATENT DOCUMENTS

| | | |
|---|---|---|
| DE | 10 2005 044 068 A1 | 3/2007 |
| DE | 10 2007 046 737 A1 | 4/2009 |
| DE | 10 2007 000 595 A1 | 5/2009 |
| DE | 10 2009 000 776 A1 | 8/2010 |
| DE | 10 2009 000 778 A1 | 8/2010 |
| DE | 10 2009 000 779 A1 | 8/2010 |
| DE | 10 2010 029 597 A1 | 12/2011 |
| DE | 10 2011 077 597 A1 | 12/2012 |
| DE | 10 2011 084 621 A1 | 4/2013 |
| DE | 10 2013 200 646 A1 | 7/2014 |
| DE | 10 2013 110 709 A1 | 4/2015 |
| EP | 0 495 942 B1 | 1/1995 |
| EP | 1 624 232 A1 | 2/2006 |

OTHER PUBLICATIONS

International Search Report Corresponding to PCT/EP2016/055421 dated Jun. 15, 2016.
International Search Report Corresponding to PCT/EP2016/055423 dated Jun. 15, 2016.
Written Opinion Corresponding to PCT/EP2016/055421 dated Jun. 15, 2016.
Written Opinion Corresponding to PCT/EP2016/055423 dated Jun. 15, 2016.

* cited by examiner

TRANSMISSION ARRANGEMENT WHICH CAN BE SHIFTED UNDER FULL LOAD, AND AGRICULTURAL WORKING MACHINE

This application is a National Stage completion of PCT/EP2016/055423 filed Mar. 14, 2016, which claims priority from German patent application serial no. 10 2015 206 881.1 filed Apr. 16, 2015.

FIELD OF THE INVENTION

The invention relates to a transmission arrangement that can be shifted under full load and to an agricultural working machine.

BACKGROUND OF THE INVENTION

In the prior art, particularly for agricultural working machines overall transmissions are known, which consist of different sub-transmission units in serial drive connection with one another. Owing to the broad spectrum of jobs that agricultural working machines have to do, such overall transmissions have to fulfill a very wide range of requirements. For example, field cultivation jobs and on-road transport journeys have to be carried out with equally good effect. This makes it necessary to have a correspondingly large spread between the slowest and the fastest gear stage. Furthermore, in agricultural machines there is no need for geometrical gear intervals between the individual gears and in combination with the large spread this leads to a large number of gears to be engaged. This large number of gears to be engaged can be realized at acceptable cost by a group configuration of the overall transmission. Accordingly, an overall transmission of an agricultural working machine usually comprises a splitter transmission with a synchromesh transmission after it, and often a range transmission downstream therefrom and a reversing transmission. In such a case, by virtue of the synchromesh transmission a gear sequence of the overall transmission is determined, which is compacted by means of the splitter transmission in that the gear stages of the synchromesh transmission can each be divided by small gear intervals of the splitter transmission and the number of gears that can be obtained in the synchromesh transmission is therefore multiplied by the number of gears that can be obtained in the splitter transmission. In contrast, by virtue of the range transmission sometimes connected downstream the gear sequence is extended, in that by virtue of large gear intervals in the range transmission the gear stages of the synchromesh transmission are translated in different transmission ranges. By means of the reversing transmission also often provided, a change of rotational direction can be obtained and in combination with the other sub-transmission units, in most cases a plurality of reverse gears can also be obtained.

In modern agricultural machine transmissions the splitter transmission and the synchromesh transmission are often combined in a common splitter group section with a range transmission in driving connection downstream therefrom. Such overall transmissions are often at least in part of powershiftable design so that when operating the agricultural machine concerned a gearshift without traction force interruption is possible at least in part. In such a case the powershifting usually takes place by virtue of a dual clutch or parallel clutch.

In this connection DE 26 45 907 describes a multi-stage transmission. The multi-stage transmission consists of a splitter group in the form of an input group with fine steps, whose fixed wheels are arranged in sequence on an input shaft driven directly by the main drive input and whose shifting clutches and loose wheels are all arranged in sequence next to one another on a first countershaft. In addition the multi-stage transmission consists of a main group in driving connection downstream from the input group, with an axial drive input shaft arranged as an extension of the first countershaft and a drive output shaft that can be driven thereby via shifting clutches and loose wheels and fixed wheels that mesh with them. Spatially arranged between the input group and the main group an intermediate transmission is provided, which contains both a gearset for a crawling gear and also a gearset for a reversing gear whose shifting elements are arranged one after another on the first transmission shaft which carries the shifting clutches of the input group. In this case both the secondary shaft of the reverse gear shifting clutch and also the drive input shaft of the main group are positioned coaxially in line with the first transmission shaft.

From DE 10 2005 044 068 A1 a powershiftable group transmission with a dual clutch is known, in which the drive input shaft and the drive output shaft are arranged coaxially with one another. The transmission input shafts associated with the two sub-transmissions each engage via input constants with one of the countershafts, and the countershafts are arranged coaxially with one another. In addition, this known transmission comprises a main shaft which can be coupled to one of the transmission input shafts to engage a direct gear. The end of the main shaft on the drive output side is connected to a sun gear which forms the input element of a range group in the form of a planetary gearset. The planetary carrier is connected in a rotationally fixed manner to a transmission output shaft or drive output shaft.

DE 10 2007 000 595 A1 discloses a parallel shift transmission consisting of a splitter group section and a range group section. In this case the function of a synchromesh transmission section and a splitter transmission section are carried out by the splitter group section, while the downstream range group section functions as a group transmission section. The splitter group section and the range group section are now divided between two parallel transmission branches, and the transmission branch concerned is selected by actuating a respective associated powershiftable element. The two powershiftable elements of the transmission branches are combined in a dual clutch, which transmits rotational movement of a drive input shaft of the parallel shift transmission to one of two input shafts of the splitter group section. Starting from the input shaft selected in each case, this rotational movement is then transmitted to a respective parallel-extending countershaft of the two transmission branches in accordance with a selection of one of several gear stages of the splitter group section with a corresponding stage gear ratio. Thereafter, the rotational movement of the countershaft concerned is then transmitted to a drive output shaft of the parallel shift transmission with a chosen range gear ratio, which is defined by shifting an associated group stage of the range group section. The gear stages of the splitter group section are in this case distributed in the sequence of their associated stage gear ratios in alternation to the two transmission branches, so that during the sequential shifting of the individual stage gear ratios there is always a change back and forth between the two transmission branches. This makes it possible, already before shifting to the next stage gear ratio, to preselect the appropriate gear stage in the currently unloaded transmission branch, so that for the ultimate shift only the powershiftable element of one branch has to be opened and that of the other branch closed. Consequently, a change of the stage gear ratio under load and therefore without traction force interruption can be carried out. The group stages of the subsequent range group section, in contrast, can each be obtained by way of both transmission branches, so that thereby a transition from the last gear in one group stage to the first gear in the next group stage can also be carried out under load. Overall therefore, a fully powershiftable parallel shift transmission is again formed.

However, the known overall transmissions have disadvantages inasmuch as, as a rule, they are either not powershiftable under full load, or—to the extent that they can be powershifted under full load—a dual clutch or parallel clutch has to be actuated for each shifting process. However, each time a shift is made by means of a dual or parallel shift clutch, an energy-intensive synchronization process of the transmission section to be shifted has to be carried out, and this results in a comparatively unfavorable energy efficiency of such overall transmissions that can be powershifted under full load.

SUMMARY OF THE INVENTION

A purpose of the present invention is to propose an improved overall transmission.

According to the invention, this objective is achieved by the transmission arrangement that can be powershifted under full load according to the independent claim(s). Advantageous design features and further developments of the invention emerge from the dependent claims.

The invention concerns a transmission arrangement that can be powershifted under full load, which comprises a plurality of torque-transmitting branches formed on the drive input side by alternatively shiftable gear stages of a splitter transmission and on the drive output side by alternatively shiftable gear stages of a synchromesh transmission, so that each torque-transmitting branch is defined by engaging a gear stage of the splitter transmission and by engaging a gear stage of the synchromesh transmission, wherein the synchromesh transmission has two input shafts of the synchromesh transmission, each in driving association with a powershiftable element. The transmission arrangement according to the invention is distinguished by the fact that the splitter transmission is designed as a powershiftable splitter transmission and, viewed in the force flow direction, the powershiftable elements are arranged after the splitter transmission but before the synchromesh transmission.

The invention also concerns a transmission arrangement whose ability to be powershifted under full load in the different torque-transmitting branches is ensured on the drive input side by the powershiftable splitter transmission and on the drive output side by the two powershiftable elements connected upstream from the synchromesh transmission as viewed in the force flow direction. The synchromesh transmission itself cannot be powershifted.

Compared with the known transmission arrangements that can be powershifted under full load, this has the advantage that the two powershiftable elements only have to be actuated when the synchromesh transmission is shifted to another gear stage. Correspondingly, only then does a comparatively energy-intensive synchronization of the gear stages of the synchromesh transmission have to be carried out. It has been shown that with the transmission arrangement according to the invention this is only comparatively seldom the case, since the powershiftable splitter transmission compresses each gear stage of the synchromesh transmission by a number of gear stages that corresponds to the number of gear stages of the splitter transmission, so that each gear stage of the synchromesh transmission already provides a wide range of driving speeds. This results by comparison in better energy efficiency when the transmission arrangement is used, since the two powershiftable elements only have to be actuated comparatively seldom. At the same time, full powershiftability is ensured.

In this connection a person with knowledge of the subject will be familiar with a number of powershiftable splitter transmissions each with a different number of forward and reverse gears, all of which can be used without restriction for the transmission arrangement according to the invention. For example, such splitter transmissions are known from DE 10 2009 000 776 A1, DE 10 2009 000 779 A1 and DE 10 2009 000 778 A1.

According to a preferred embodiment of the invention it is provided that the splitter transmission is in driving connection with the powershiftable elements byway of a single drive output shaft of the splitter transmission. Thus, all the torque-transmitting branches pass by way of the single drive output shaft of the splitter transmission, which forms a driving connection between the splitter transmission and the powershiftable elements. This brings the advantage that on the one hand torque and rotational speed identical in each case can be transmitted to the two powershiftable elements, and on the other hand the manufacturing costs of the transmission arrangement are kept low.

It should moreover be said that the splitter transmission can also have further drive output shafts, but that it is in driving connection with the powershiftable elements by way of only a single one of the plurality of drive output shafts of the splitter group that may be present.

In another preferred embodiment of the invention it is provided that the transmission arrangement is designed such that the torque-transmitting branches associated with the gear stages of the synchromesh transmission are activated in accordance with a gear stage sequence of the synchromesh transmission in alternation, respectively, via one of the two powershift elements. Thus, in each gear stage change the torque-transmitting branches of the synchromesh transmission are switched over from whichever powershiftable element is under load to that powershiftable element which is not loaded. This simplifies a powershift process of the synchromesh transmission from an engaged gear to a gear before or after engaged gear that is to be engaged, since the powershiftable element that is closed and through which the torque-transmitting branch passes is opened, while at the same time the powershiftable element which is open and in driving connection with the gear to be engaged is closed, so that the active torque-transmitting branch now passes by way of the latter powershiftable element.

In this context the gear stage sequence is preferably so designed that the transmission ratio of a respective previous gear to a respective following gear of the synchromesh transmission increases sequentially. In this, however, it is not provided that the transmission elements of the synchromesh transmission associated with the respective previous and following gears, such as loose wheels and fixed wheels, are also arranged sequentially on a common shaft. Rather, the transmission elements associated with the respective previous and following gears of the synchromesh transmission are distributed in alternation on two different shafts in such manner that the two different shafts are respectively in driving connection each with one of the two powershiftable elements.

Thus, all the gear stages of the synchromesh transmission can be engaged sequentially or in reverse sequence in the gear sequence of the synchromesh transmission, without the load flow between an input of the splitter transmission and a drive output of the synchromesh transmission being interrupted.

According to a further preferred embodiment of the invention, it is provided that the two powershiftable elements are combined in a dual-clutch or parallel-clutch arrangement. These configurations of the two powershiftable elements have been found appropriate as regards the fitting space required and the production costs.

When the two powershiftable elements are configured in a dual-clutch arrangement, particularly preferably one output shaft of one powershiftable element is in the form of a hollow shaft which surrounds the output shaft of the other powershiftable element coaxially. The output shafts of the two powershiftable elements are in fact the two input shafts of the synchromesh transmission.

In another preferred embodiment of the invention it is provided that the synchromesh transmission comprises at least one shifting packet which combines shifting clutches of loose wheels of different gears of the synchromesh transmission which are arranged on a common shaft. This saves fitting space and serves to simplify an associated shift actuating device.

According to a further preferred embodiment of the invention it is provided that a first drive output of the synchromesh transmission can be brought into driving connection with a drivable rear axle of a vehicle. The entire transmission arrangement is in such a case designed for use in a vehicle. Particularly when the transmission arrangement according to the invention is used in an agricultural working machine, then owing to the fact that the tires on the rear axle are usually bigger than those on the front axle this is advantageous as regards ease of movement over the terrain and the transfer of force to the subsurface.

According to a particularly preferred embodiment of the invention it is provided that the first drive output is in the form of a bevel-gear drive, such that the bevel-gear drive can be brought into driving connection with a crown wheel of the drivable rear axle. A bevel-gear drive makes possible an angular offset of the axis of the bevel gear and the axis of the crown gear, which increases the design flexibility when designing the transmission arrangement and the rear axle. Furthermore, a bevel-gear drive enables usually high transmission ratios in the sense of reducing the rotational speed and increasing the torque. This in turn favors the use of the transmission arrangement according to the invention in a utility vehicle, especially in an agricultural working machine.

In another preferred embodiment of the invention it is provided that a second drive output of the synchromesh transmission can be engaged by means of a further powershiftable element. Thus, by way of the second drive output of the synchromesh transmission torque can also be provided for other purposes as well, apart from driving the rear axle. By using a further powershiftable element for engaging the second drive output of the synchromesh transmission, the second drive output can be engaged at any time, flexibly and in a load-independent manner.

According to a particularly preferred embodiment of the invention it is provided that the second drive output of the synchromesh transmission can be brought into driving connection with a drivable front axle of the vehicle. This has the advantage of providing the vehicle, by way of the second drive output, with all-wheel drive that can be switched on or off depending on the situation. For example, the all-wheel drive mode of the vehicle can be switched on during working use under high load in order to improve the ease of movement over terrain and the transfer of force to the subsurface, whereas it is turned off during transport journeys in order to save fuel.

In a very particularly preferred embodiment of the invention, it is provided that the synchromesh transmission is designed such that by virtue of a gear ratio the second drive output has a drive output rotational speed different from that of the first drive output. This favors the use of different tires on the front and rear axles of the vehicle without having to provide an additional gear ratio transmission in the vehicle. In particular, the ratio of the drive output rotational speed of the first drive output to the drive output rotational speed of the second drive output corresponds to the ratio of the rolling circumference of the front axle tires to that of the rear axle tires. To have such different tires on the front and rear axles is usual in the case of agricultural machines.

In a further preferred embodiment of the invention it is provided that the synchromesh transmission comprises at least one intermediate wheel for reversing the rotation direction. Thus, the synchromesh transmission advantageously enables a rotation direction reversal of the drive output rotational speed or drive output torque, and therefore also a reversal of the travel direction of the vehicle. Thus a separate reversing transmission is not needed, and this keeps down the weight, cost and manufacturing complexity of the transmission arrangement according to the invention.

According to a further preferred embodiment of the invention it is provided that the transmission arrangement comprises a reversing transmission and/or a crawling gear gearset. By virtue of a comparatively high gear ratio in the sense of a rotational speed reduction and a torque increase, the crawling gear gearset enables the vehicle to be driven comparatively at an extremely slow speed. In contrast, the reversing transmission enables the direction of the drive output rotational speed and drive output torque to be reversed, and by comparison with the rotation direction reversal by the synchromesh transmission offers a larger number of possible reversing gears, since it allows each individual forward gear stage of the synchromesh transmission to be inverted. Thus, the reversing transmission and the crawling gear gearset increase the flexibility and hence also the potential use options of a vehicle having the transmission arrangement according to the invention with a reversing transmission and a crawling gear gearset.

Preferably, it is provided that as viewed in the force flow direction, the reversing transmission and the crawling gear gearset are arranged after the splitter transmission and before the two powershiftable elements.

In another preferred embodiment of the invention it is provided that the splitter transmission has a further drive output shaft designed as a power take-off shaft. This enables the use of drivable working aggregates that can be coupled to the vehicle, which is particularly advantageous when the vehicle concerned is an agricultural working machine. Examples of such drivable working aggregates are perhaps mowers, straw balers or fertilizer spreaders.

According to a further preferred embodiment of the invention it is provided that the synchromesh transmission is designed such that at least two forward gear stages and one reverse gear stage can be obtained. In combination with a splitter transmission such a design of the synchromesh transmission has been found to be appropriate.

The invention also concerns an agricultural working machine that comprises a transmission arrangement according to the invention. The use of the transmission arrangement according to the invention in the agricultural working machine results in the advantages already described in connection with the transmission arrangement according to the invention.

BRIEF DESCRIPTION OF THE DRAWINGS

Below, examples of the invention are explained with reference to embodiments illustrated in the figures, which show.

DETAILED DESCRIPTION OF THE PREFERRED EMBODIMENTS

The same objects, functional units and comparable components are denoted by the same indexes in all of the figures. These objects, functional units and comparable components are identically designed as regards their technical characteristics unless explicitly or implicitly indicated otherwise in the description.

Figure 1:
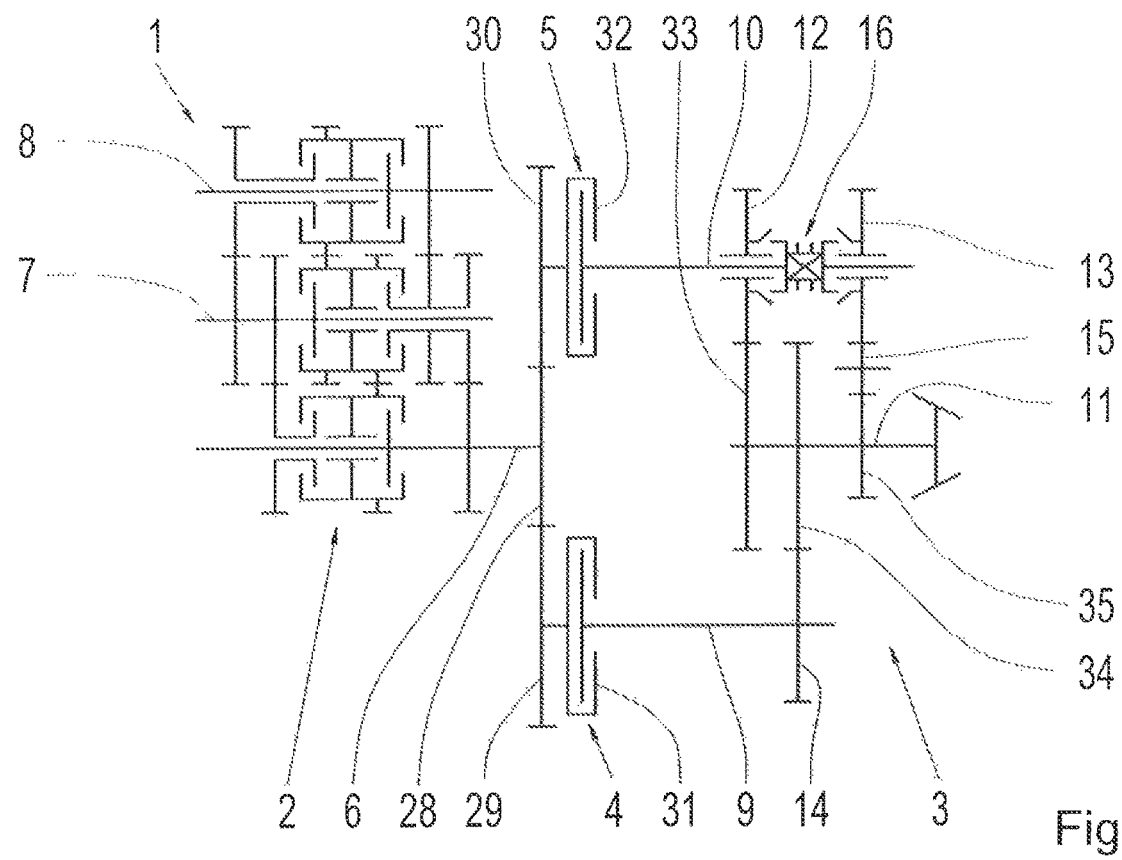
FIG. 1: A schematic representation of a first embodiment of a transmission arrangement according to the invention.

FIG. 1 shows a schematic representation of a first embodiment of a transmission arrangement 1 according to the invention, which consists of a powershiftable splitter transmission 2, a synchromesh transmission 3 and two powershiftable elements 4 and 5 arranged in the force flow direction after the splitter transmission 2 and before the synchromesh transmission 3. In this example the powershiftable elements 4 and 5 are in the form of wet-operating disk clutches. The splitter transmission 2 is in driving connection with the powershiftable elements 4 and 5 by way of a single drive output shaft 6 of the splitter transmission 2. As can also be seen, the two powershiftable elements 4 and 5 are combined in a parallel-clutch configuration, which favors an axially compact structure of the example transmission arrangement 1. Besides the drive output shaft 6, the splitter transmission 2 also comprises an input shaft 7 and a countershaft 8. The embodiment of the splitter transmission 2 shown as an example enables a total of nine powershiftable forward gears to be obtained. The synchromesh transmission 3 is connected in a rotationally fixed manner by way of the input shafts 9 and 10 each to a respective inner disk carrier of the powershiftable elements 4 and 5. Thus, each of the input shafts 9 and 10 is in driving association with a respective powershiftable element 4 or 5. Furthermore, in this example the synchromesh transmission has a first drive output 11 of the synchromesh transmission 3, which is in driving connection with a drivable rear axle of a vehicle (not shown). For this purpose the first drive output 11 is designed as a bevel-gear drive and is in driving connection with a crown gear (also not shown) of the drivable rear axle of the vehicle. The use of a bevel-gear drive enables not only a flexible and angularly offset arrangement of the axis of the bevel gear 11 and the axis of the crown gear, but also enables a comparatively high gear ratio in the sense of reducing the rotational speed and increasing the torque, which in turn favors the use of the transmission arrangement according to the invention in a utility vehicle, especially in an agricultural working machine. As can also be seen from FIG. 1, the synchromesh transmission 3 is designed such that two forward gears and one reverse gear can be obtained, wherein the loose wheels 12 and 13 associated respectively with the first forward gear and the reverse gear are both arranged on the input shaft 10. The reversal of rotational direction required for driving in reverse by means of the reverse gear is produced by the intermediate wheel 15. In contrast, the fixed wheel 14 associated in this example with the second forward gear is arranged on the input shaft 9. Correspondingly, the loose wheels 12 and 13 and hence the first forward gear and the reverse gear are connected into the force flow by way of the powershiftable element 5, whereas the fixed wheel 14 and hence the second forward gear is connected into the force flow by way of the powershiftable element 4. The force flow first passes from the splitter transmission 2 via the drive output shaft 6 to the fixed wheel 28. The fixed wheel 28 in this example meshes with the fixed wheels 29 and 30, which are connected rotationally fixed to the clutch bells 31 and 32 respectively. When closed, the powershiftable elements 4 and 5 transmit the force flow to the respective input shafts 9 and 10 in driving connection downstream from them. On the other hand, in the open condition the powershiftable elements 4 and 5 do not transmit any force flow. To shift from the first forward gear to the reverse gear and vice-versa, in this example the synchromesh transmission 3 comprises a shifting packet 16 that combines shifting clutches of the loose wheels 12 and 13 arranged on the input shaft 10. In this case the shifting packet acts upon the loose wheels 12 and 13 in such manner that when the powershiftable element 5 is closed, the force flow passes via one of the loose wheels 12 or 13. In contrast, when the powershiftable element 4 is closed the force flow passes via the fixed wheel 14. In a gearshift process for example from the first forward gear to the second forward gear, the powershiftable element 5 is opened and almost at the same time the powershiftable element 4 is closed, so that the force flow from the input shaft 7 of the splitter transmission 2 to the drive output 11 of the synchromesh transmission 3 is not interrupted. For a time of a few hundredths of a second to a few tenths of a second both powershiftable elements 4 and 5 are partially closed during this. This condition is also known as "slipping" of a clutch and serves to synchronize the rotational speed of the input shaft 9. Thus, the transmission arrangement 1 is designed such that the torque-transmitting branches associated with the gears of the synchromesh transmission 3 are activated in accordance with a gear sequence of the synchromesh transmission 3 respectively via one of the two powershiftable elements 4 or 5 in alternation.

Correspondingly, the torque-transmitting branches are switched over during each gearshift of the synchromesh transmission 3 from whichever powershiftable element 4 or 5 is under load to the powershiftable element 4 or 5 which is unloaded. This enables a powershift process of the synchromesh transmission 3. Depending on the gear engaged, the force flow passes from the loose wheels 12 or 13 or from the fixed wheel 14 to the respectively associated fixed wheel 33, 34 or 35, which are arranged in a rotationally fixed manner on the drive output 11. Thus, by means of the transmission arrangement 1 shown as an example, a plurality of torque-transmitting branches can be produced, which are formed on the drive input side by alternately engaged gears of the powershiftable splitter transmission 2 and on the drive output side by alternately engaged gears of the synchromesh transmission 3, so that each torque-transmitting branch is defined by engaging a gear of the splitter transmission 2 and engaging a gear of the synchromesh transmission 3.

Figure 2:
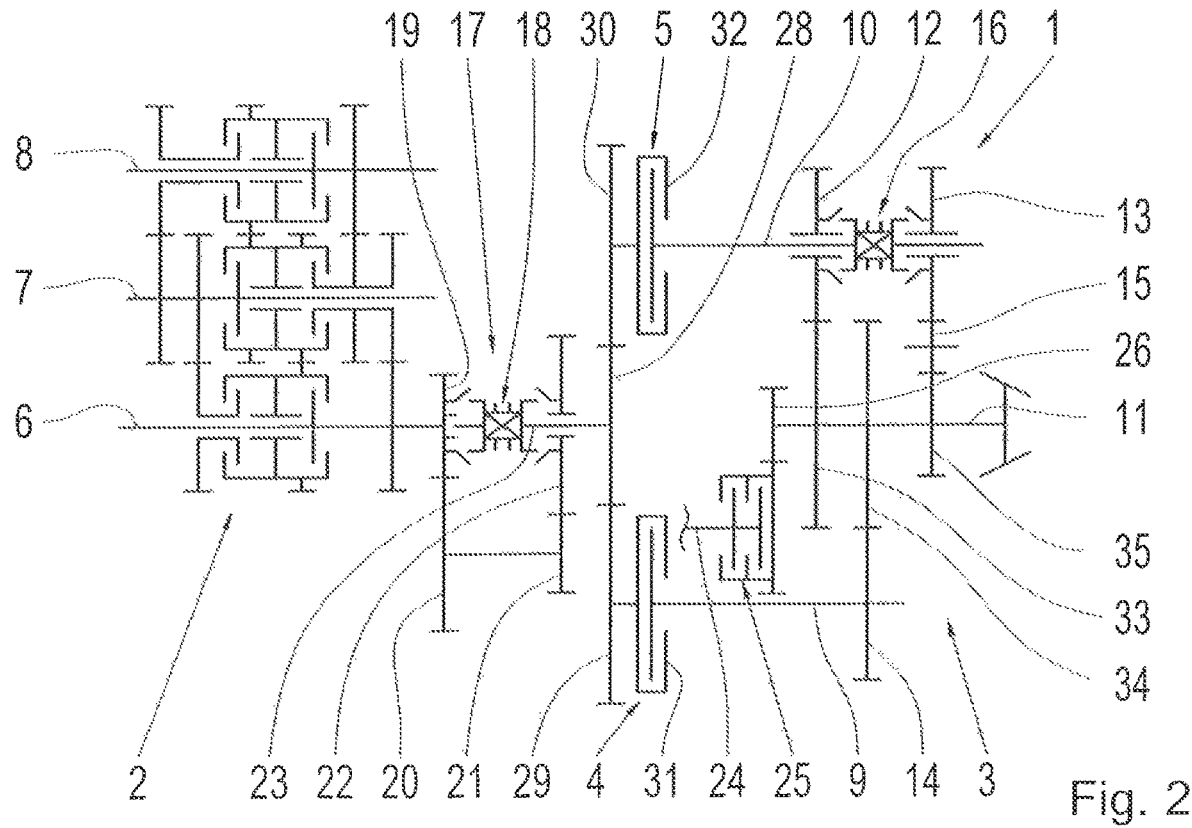
FIG. 2: A schematic representation of a second embodiment of a transmission arrangement according to the invention.

FIG. 2 shows a schematic representation of a second embodiment of a transmission arrangement 1 according to the invention, which differs from the embodiment shown in FIG. 1 only by the presence of a crawling gear gearset 17 and a second drive output 24 of the synchromesh transmission 3, such that the second drive output 24 can be engaged by means of a further powershiftable element 25. In this example, further powershiftable element 25 is in the form of a wet-operating disk clutch. In this example, the crawling gear gearset 17 is arranged between the splitter transmission 2 and the powershiftable elements 4 and 5. It can be engaged or disengaged by means of a shifting packet 18. In the engaged condition the force flow passes from the drive output shaft 6, via the loose wheel 19, to the fixed wheel 20 and from there, via the fixed wheel 21, to the loose wheel 22. When the crawling gear 17 is engaged the loose wheel 22 is in driving connection with the shaft 23. Since the force flow passes along the torque-transmitting branch described, by virtue of a comparatively high gear ratio in the sense of reducing the rotational speed and increasing the torque the vehicle with the transmission arrangement 1 can be driven comparatively at an extremely slow speed. In this example the second drive output 24 of the synchromesh transmission 3 is in driving connection with a drivable front axle of the vehicle. This makes it possible thanks to the further powershiftable element 25 to engage or disengage an all-wheel drive mode of the vehicle as necessary. In this example the synchromesh transmission 3 is designed such that by virtue of a gear ratio the second drive output 24 has a rotational speed different from that of the first drive output 11, gear ratio being produced by the fixed wheels 26 and 27. In turn, the gear ratio is designed such that the use of different tires on the front and rear axles of the vehicle is favored, without the need for additional transmission gearing in the vehicle. The use of such different tires on the front and rear axles is usual in the case of agricultural working machines. Correspondingly, the ratio of the drive output rotational speed of the first drive output 11 to the drive output rotational speed of the second drive output 24 corresponds to the ratio of the rolling circumference of the front axle tires to that of the rear axle tires. In this case the gear sequence is preferably chosen such that the transmission ratio from a respective previous gear to a respective next gear of the synchromesh transmission 3 increases sequentially.

Figure 3:
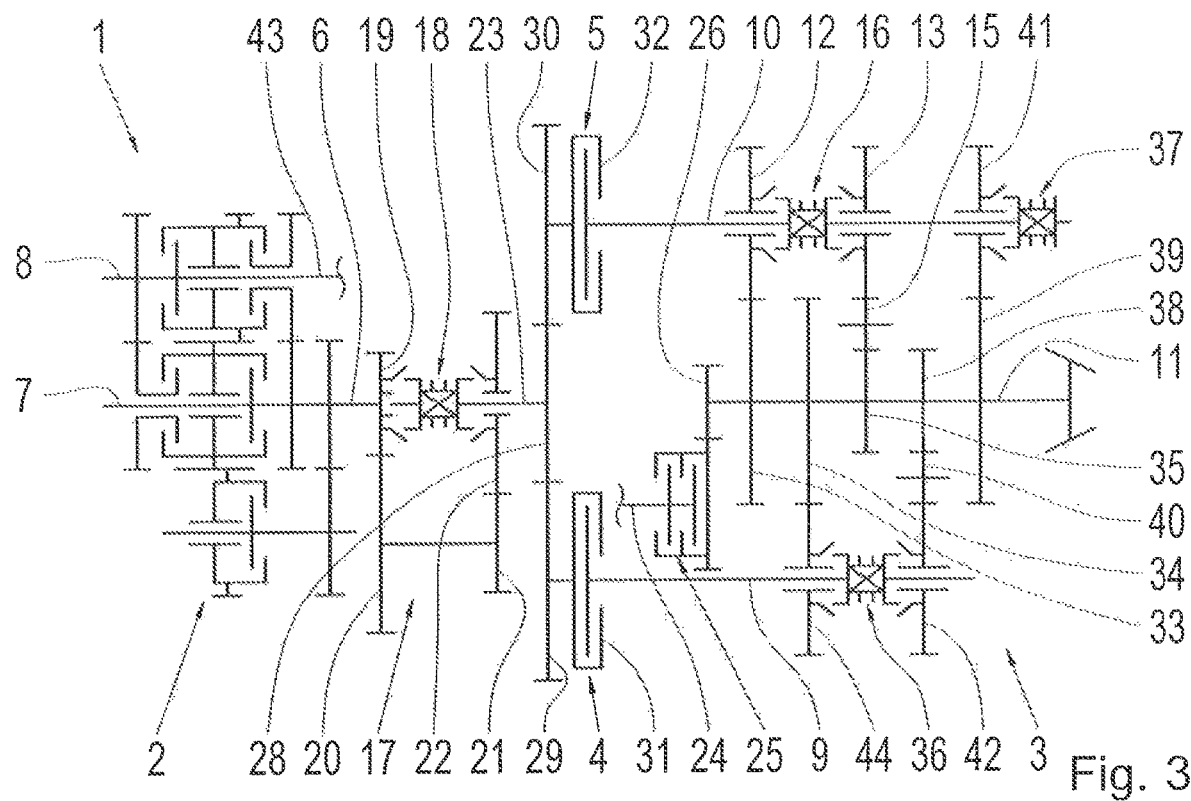
FIG. 3: A schematic representation of a third embodiment of a transmission arrangement according to the invention.

FIG. 3 is a schematic representation of a third embodiment of a transmission arrangement 1 according to the invention, which differs from the embodiment illustrated in FIG. 2 in the structure of the splitter transmission 2 and the structure of the synchromesh transmission 3. In this example the splitter transmission 2 is designed in such manner that it can produce six powershiftable forward gears. In the example the synchromesh transmission 3 is designed such that it can produce three forward gears and two reverse gears. For this, compared with the synchromesh transmission 3 described in FIGS. 1 and 2 it comprises additional shifting packets 36 and 37 and fixed wheels 38 and 39, an intermediate wheel 40 and loose wheels 41 and 42. In this case too the gears of the synchromesh transmission 3 are arranged in such manner that all the gears of the synchromesh transmission 3 in the gear sequence or in the reverse sequence of the synchromesh transmission 3 can be engaged sequentially without interrupting the load flow between the input shaft 7 of the splitter transmission 2 and the drive output 11 of the synchromesh transmission 3. In addition, the splitter transmission 2 of the example in FIG. 3 has a further drive output shaft 43 designed as a power take-off shaft which enables the use of drivable working aggregates that can be coupled to the vehicle, this being particularly advantageous when the vehicle concerned is an agricultural working machine.

Figure 4:
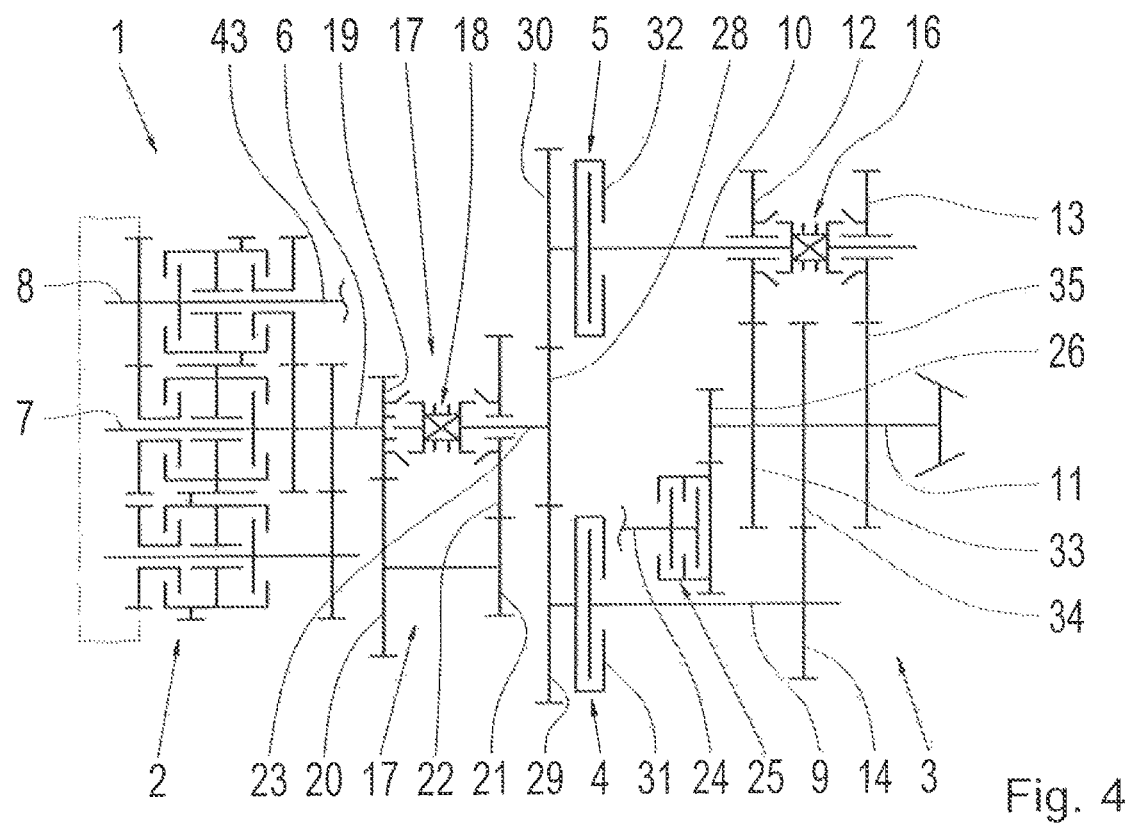
FIG. 4: A schematic representation of a fourth embodiment of a transmission arrangement according to the invention.

FIG. 4 shows a schematic representation of a fourth embodiment of a transmission arrangement 1 according to the invention, which differs from the embodiments shown so far in the structures of the splitter transmission 2 and the synchromesh transmission 3. Namely, in this example the splitter transmission 2 is designed such that it can provide six powershiftable forward gears and six powershiftable reverse gears. The dotted line represents a meshing engagement of the gearwheels connected by dotted line. In this example the synchromesh transmission 3 is designed such that it can only produce three forward gears.

Figure 5:
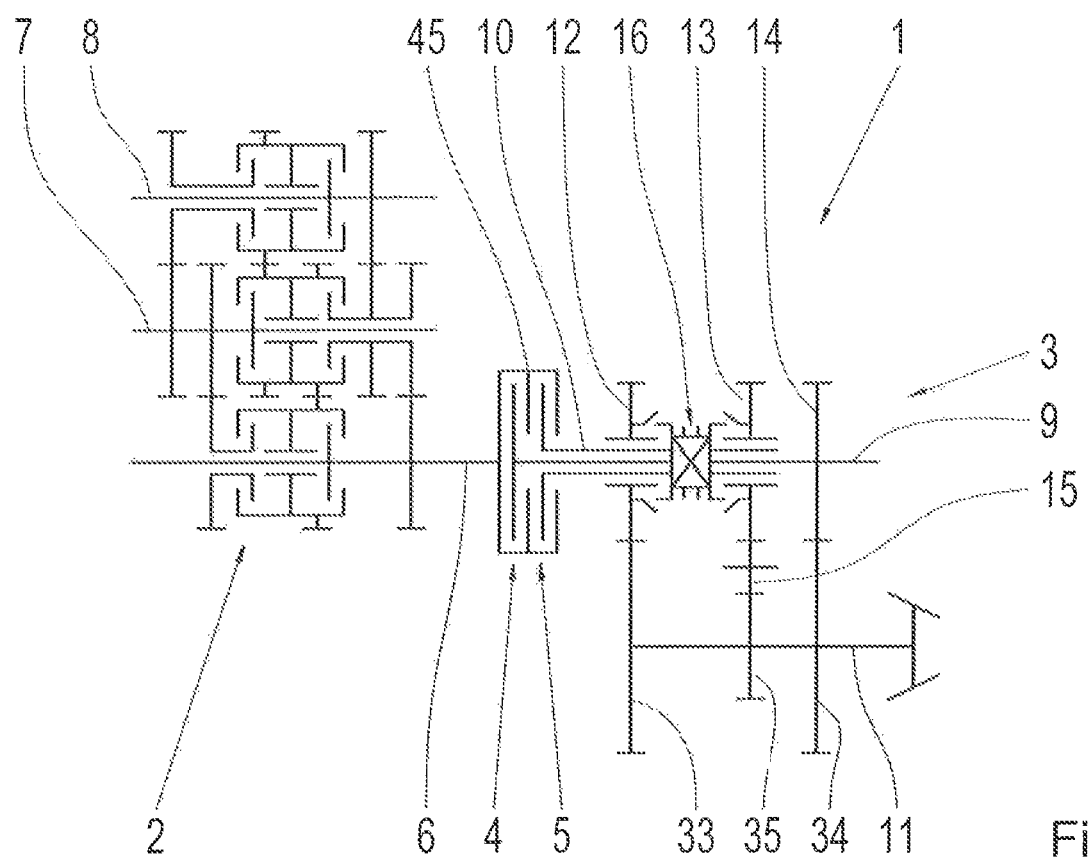
FIG. 5: A schematic representation of a fifth embodiment of a transmission arrangement according to the invention.

FIG. 5 shows a schematic representation of a fifth embodiment of a transmission arrangement 1 according to the invention, which is to a large extent identical to the first embodiment shown in FIG. 1. In contrast to the latter, however, the powershiftable elements 4 and 5 are in the form of a dual-clutch arrangement with a common clutch bell 45. As can be seen, in this example the input shaft 10 is a hollow shaft that surrounds the input shaft 9 coaxially. This favors a laterally compact structure of the example transmission arrangement 1. In the embodiment shown in FIG. 5, the loose wheels 12 and 13 are also arranged on the input shaft 10, whereas the fixed wheel 14 is again arranged on the input shaft 9. Thanks to the configuration of the powershiftable elements 4 and 5 as a dual-clutch arrangement the drive output shaft 6 of the splitter transmission 2 can also be connected directly to the clutch bell 45 in a rotationally fixed manner, so that the fixed wheels 28, 29 and 30 shown in FIG. 1 are advantageously not needed. As can also be seen, the synchromesh transmission 3 is designed such that two forward gears and one reverse gear can be obtained, wherein the first forward gear and the reverse gear are associated with the loose wheels 12 and 13 respectively. Correspondingly, the loose wheels 12 and 13 and hence the first forward gear and the reverse gear are connected into the force flow by way of the powershiftable element 5. The second forward gear is associated with the fixed wheel 14, which is connected into the force flow by the powershiftable element 4. Even with the configuration of the powershiftable elements 4 and 5 in a dual-clutch arrangement, only one of the powershiftable elements 4 or 5 is ever closed at any one time whereas the other of the powershiftable elements 4 or 5 is open. An exception to this is again a shifting process from a gear of the synchromesh transmission 3 to an adjacent gear of the synchromesh transmission 3, during which both powershiftable elements 4 and 5 are transitionally closed for a time between a few hundredths to a few tenths of a second. This serves to synchronize the rotational speeds of the input shaft 9 and the input shaft 10. Thus, in the example embodiment of FIG. 5 as well, a shift from a gear of the synchromesh transmission 3 to an adjacent gear of the synchromesh transmission 3 without interrupting the load flow can be ensured. In this case too the transmission arrangement 1 is designed such that the torque-transmitting branches associated with the gears of the synchromesh transmission 3 are activated in accordance with a gear sequence of the synchromesh transmission 3 in alternation by way of one of the two powershiftable elements 4 or 5 in each case.

Figure 6:
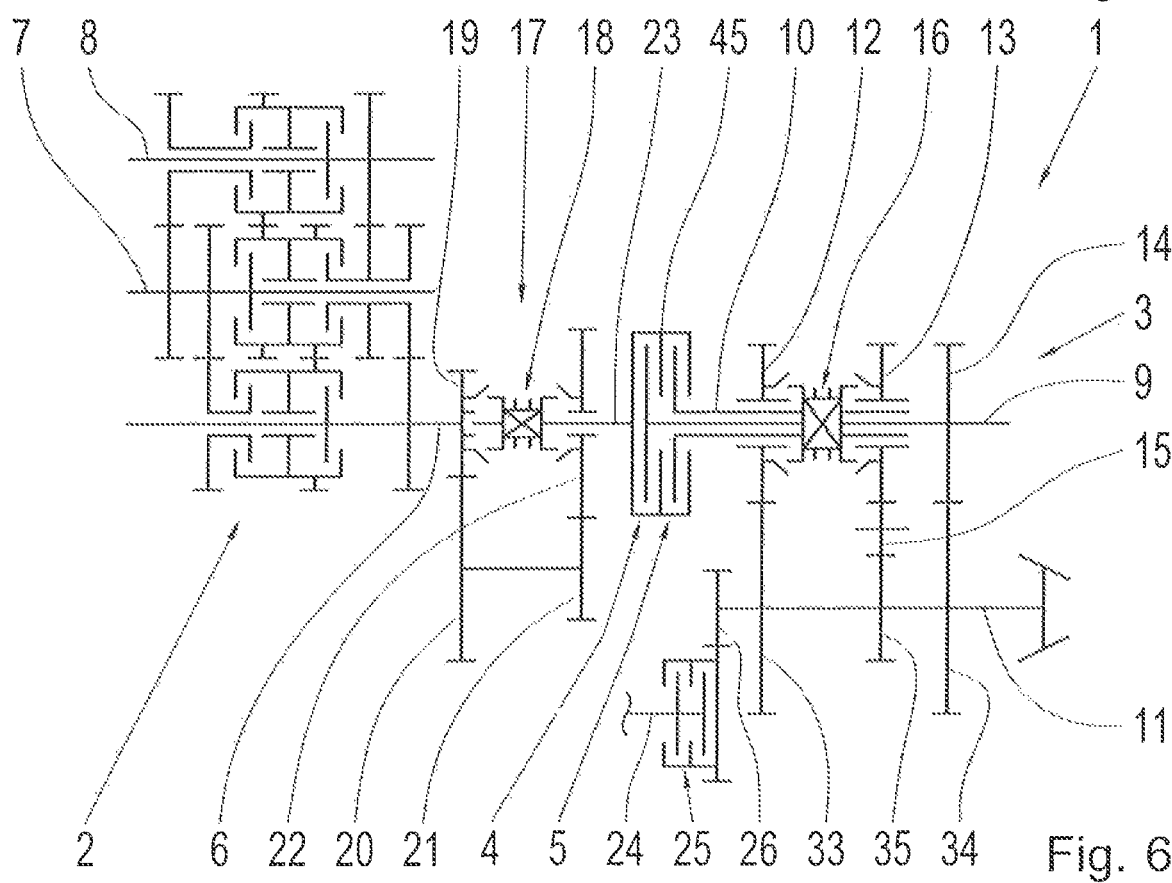
FIG. 6: A schematic representation of a sixth embodiment of a transmission arrangement according to the invention.

FIG. 6 shows a schematic representation of a sixth embodiment of a transmission arrangement 1 according to the invention, which is largely identical to the fifth embodiment shown in FIG. 5. In contrast to the latter, however, the transmission arrangement shown as an example in FIG. 6 comprises the crawling gear gearset 17 and the second drive output 24 of the synchromesh transmission 3, wherein second drive output 24 can be engaged via the further powershiftable element 25. The crawling gear gearset 17 can again be engaged or disengaged by means of the shifting packet 18. In the engaged condition the crawling gear gearset 17 is in driving connection with the clutch bell 45 by way of the shaft 23. In the disengaged condition, in contrast, the initial rotational speed or the initial torque of the splitter transmission 2 is transmitted on via the drive output shaft 6 of the splitter transmission 2 without further gear translation by way of the crawling gear gearset 17 to the shaft 23, i.e. in its disengaged condition the crawling gear gearset 17 is not in driving connection with the clutch bell 45 but is bridged across in driving terms. In this example the second drive output 24 of the synchromesh transmission 3 is in driving connection with the drivable front axle of the vehicle, so that by virtue of a gear ratio the second drive output 24 has a drive output rotational speed different from that of the first drive output 11, which is produced by the fixed wheels 26 and 27. In this case too the gear ratio is again such as to enable the use of different tires on the front and rear axles of the vehicle without having to provide an additional ratio transmission for that purpose.

Figure 7:
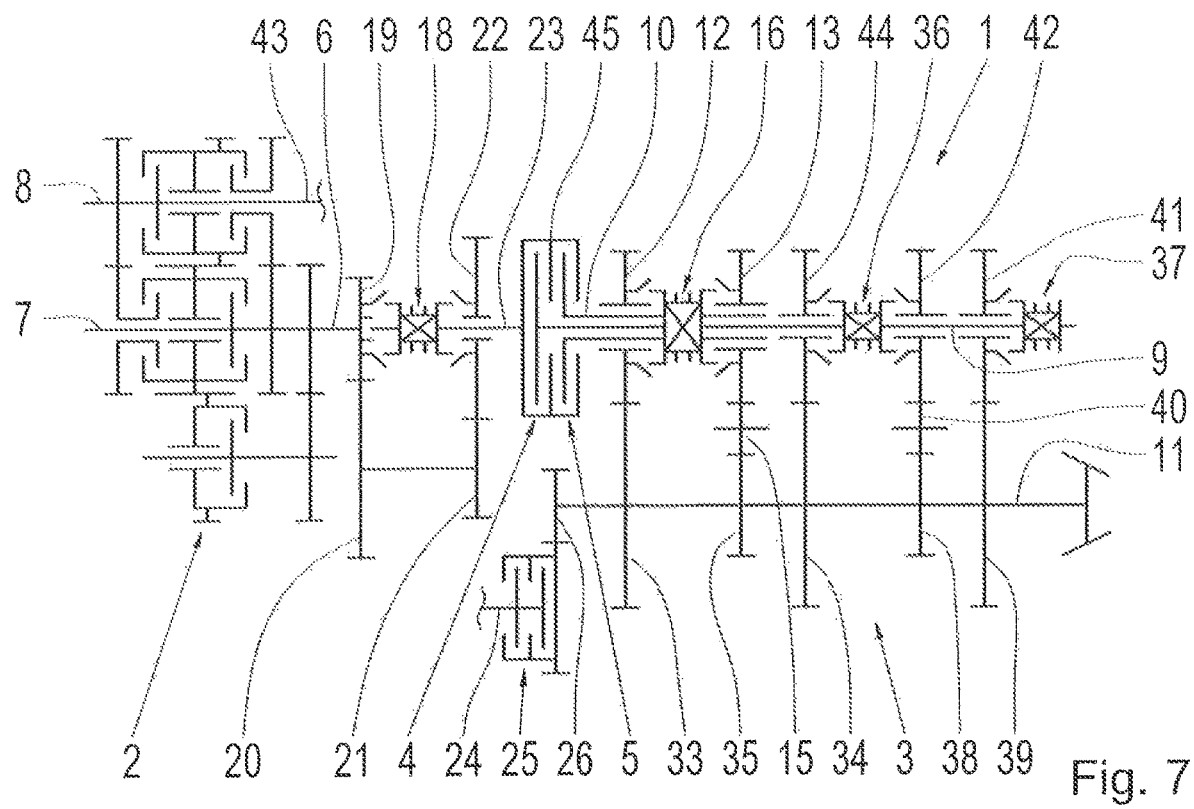
FIG. 7: A schematic representation of a seventh embodiment of a transmission arrangement according to the invention.

FIG. 7 shows a schematic representation of a seventh embodiment of a transmission arrangement 1 according to the invention, which differs from the embodiment shown in FIG. 6 in the structure of the splitter transmission 2 and the structure of the synchromesh transmission 3. In this example the splitter transmission 2 is designed such that it can produce six powershiftable forward gears. In this example, moreover, the synchromesh transmission 3 such that it can produce three forward gears and two reverse gears. For this, compared with the synchromesh transmissions 3 described in FIG. 5 or 6 it comprises in addition the shifting packets 36 and 37 and the fixed wheels 38 and 39, the intermediate wheel 40 and the loose wheels 41 and 42. The gears of the synchromesh transmission 3 are again arranged such that all the gears of the synchromesh transmission 3 can be shifted sequentially in the gear sequence or the reverse gear sequence of the synchromesh transmission 3 without interrupting the load flow between the input shaft 7 of the splitter transmission 2 and the output 11 of the synchromesh transmission 3. The splitter transmission 2 in FIG. 7 also comprises a further drive output shaft 43 designed as a power take-off shaft 43, which enables the use of drivable working aggregates that can be coupled to the vehicle.

Figure 8:
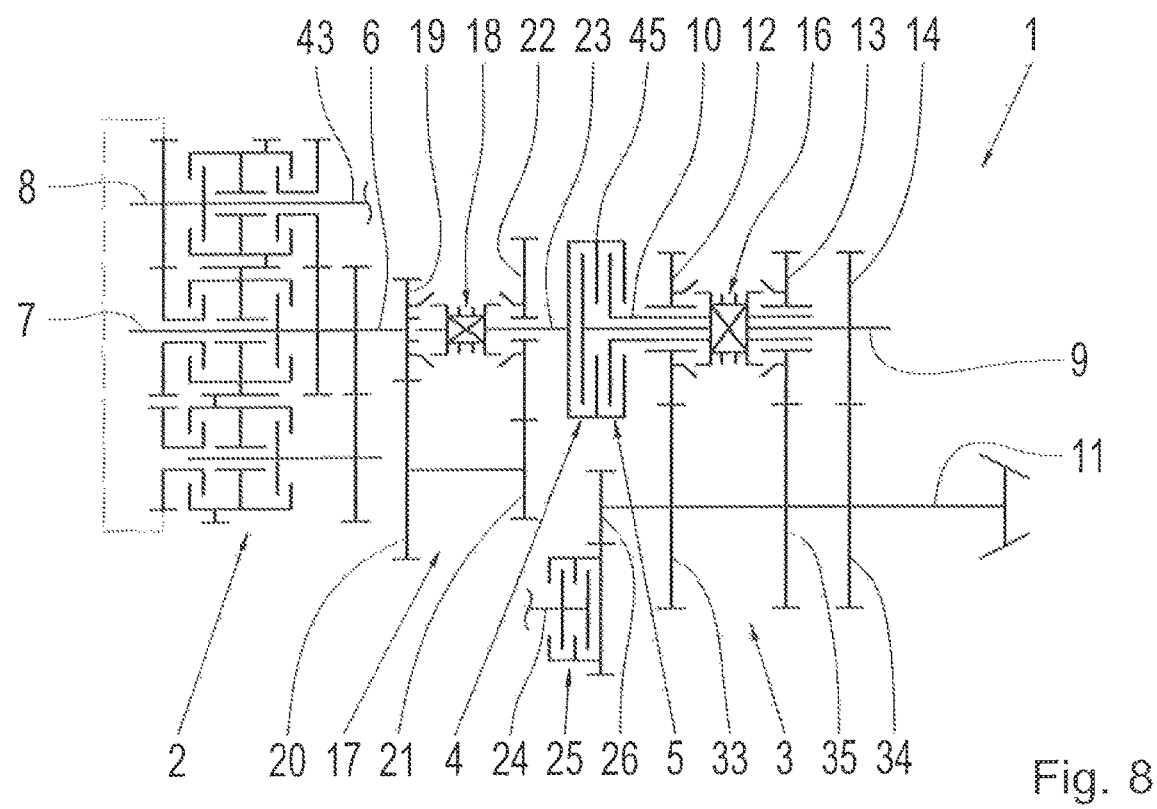
FIG. 8: A schematic representation of an eighth embodiment of a transmission arrangement according to the invention.

FIG. 8 shows a schematic representation of an eighth embodiment of a transmission arrangement 1 according to the invention, which differs from the embodiments of FIGS. 5 to 7 in the structures of the splitter transmission 2 and the synchromesh transmission 3 shown as examples. Namely, in this example the splitter transmission 2 is so designed that it can produce six powershiftable forward gears and six powershiftable reverse gears. In this case the dotted line indicates meshing of the gearwheels connected by dotted line. In contrast, the synchromesh transmission 3 is designed such that it can provide only three forward gears.

Figure 9A:
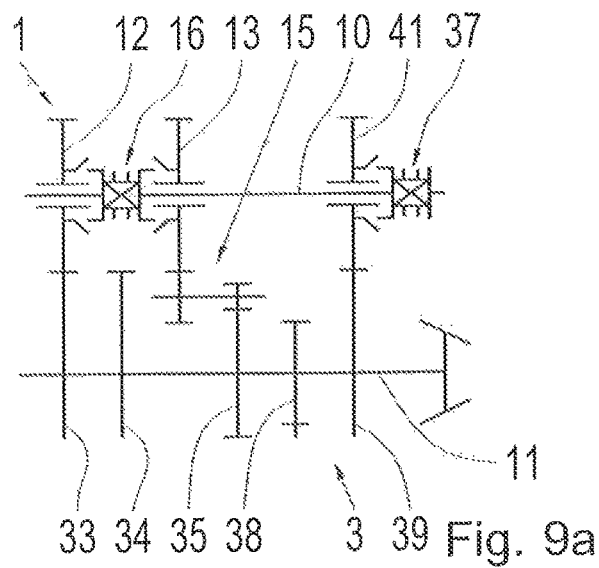
FIGS. 9*a*, 9*b*: Schematic representations of a ninth embodiment of a transmission arrangement according to the invention.
Figure 9B:
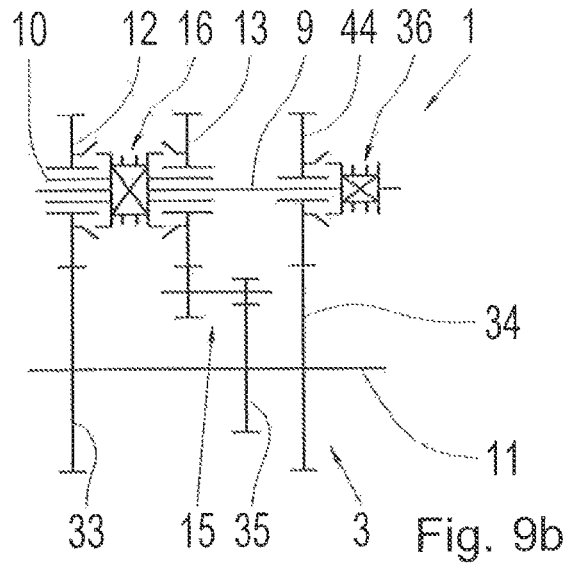

FIGS. 9a and 9b show schematic representations of parts of a ninth embodiment of a transmission arrangement 1 according to the invention, which differs from the embodiment shown respectively in FIG. 1 (FIG. 9a) or in FIG. 5 (FIG. 9b) in this example by configuring the intermediate wheel 15 as a double intermediate wheel 15. This enables an additional transmission ratio of the rotational speed when a reverse gear is engaged. As an alternative example, the example embodiments of FIG. 9a or 9b differ from any of the embodiments shown in FIGS. 2 to 4 or FIGS. 6 to 8 by configuring the intermediate wheel 15 as a double intermediate wheel 15. With regard to FIG. 3 or 7 in particular, the intermediate wheel 40 can also be made as a double intermediate wheel 40 (not shown).

Figure 10A:
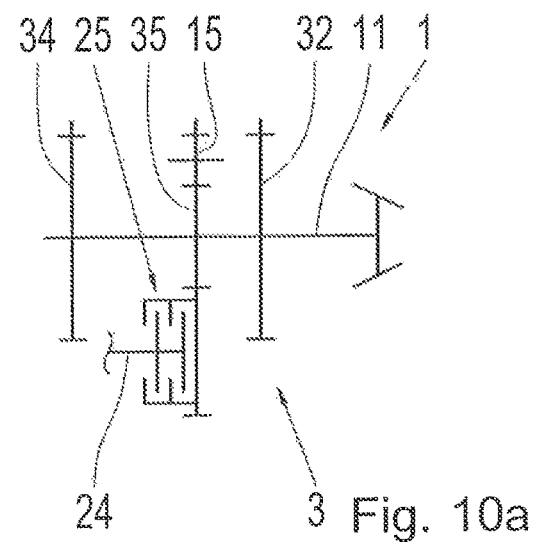
FIGS. 10*a*, 10*b*: Schematic representations of a tenth embodiment of a transmission arrangement according to the invention.
Figure 10B:
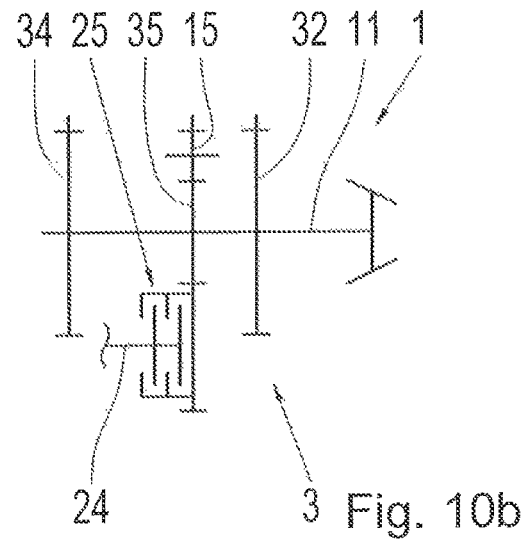

FIGS. 10a and 10b show schematic representations of parts of a tenth embodiment of a transmission arrangement 1 according to the invention, which differs from the previously shown embodiments in FIGS. 1 to 4 (FIG. 10a) or FIGS. 5 to 8 (FIG. 10b) in the arrangement of the second drive output 24 and the further powershiftable element 25. In this example the second drive output 24 and the further powershiftable element 25 are in driving association with the fixed wheel 35 on the drive output 11 of the synchromesh transmission 3. As an alternative example, the second drive output 24 and the further powershiftable element 25 can also be in driving association with any other fixed wheel on the drive output 11 of the synchromesh transmission 3 or on one of the input shafts 9 or 10.

Figure 11A:
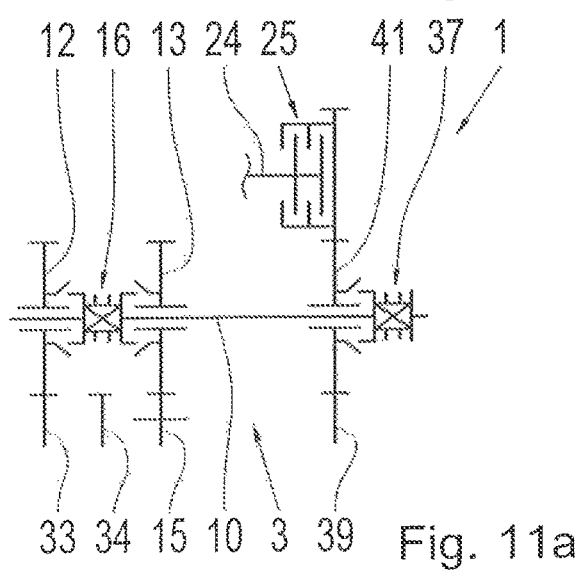
FIGS. 11*a*, 11*b*: schematic representations of an eleventh embodiment of a transmission arrangement according to the invention.
Figure 11B:
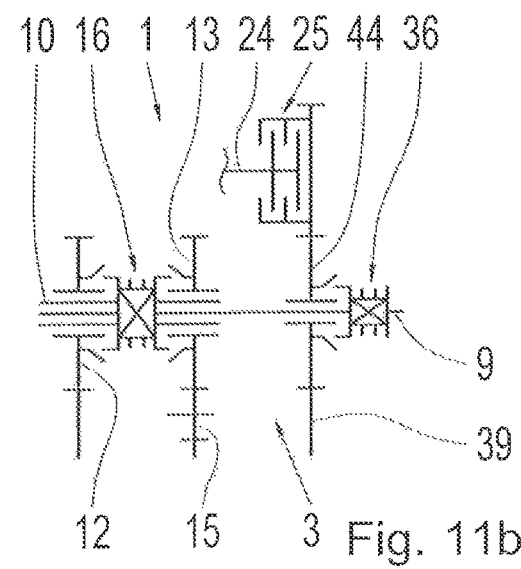

FIGS. 11a and 11b show schematic representations of parts of an eleventh embodiment of a transmission arrangement 1 according to the invention, which differs from the embodiments shown in FIG. 10 in that the second drive output 24 and the further powershiftable element 25 are in each case in driving association with the loose wheel 41 on the input shaft 10 of the synchromesh transmission 3. As an alternative example the second drive output 24 and the further powershiftable element 25 can also be in driving association with any other loose wheel on the input shaft 10 or on the input shaft 9 of the synchromesh transmission 3.

INDEXES

1 Transmission arrangement
2 Splitter transmission
3 Synchromesh transmission
4 Powershift element, wet-operating disk clutch
5 Powershift element, wet-operating disk clutch
6 Drive output shaft of the splitter transmission
7 Input shaft of the splitter transmission
8 Countershaft of the splitter transmission
9 Input shaft of the synchromesh transmission
10 Input shaft of the synchromesh transmission
11 First drive output of the synchromesh transmission
12 Loose wheel
13 Loose wheel
14 Fixed wheel
15 Intermediate wheel
16 Shifting packet 17 Crawling gear gearset
18 Shifting packet
19 Loose wheel
20 Fixed wheel
21 Fixed wheel
22 Loose wheel
23 Shaft
24 Second drive output of the synchromesh transmission
25 Powershiftable element, wet-operating disk clutch
26 Fixed wheel
27 Fixed wheel
28 Fixed wheel
29 Fixed wheel
30 Fixed wheel
31 Clutch bell
32 Clutch bell
33 Fixed wheel
34 Fixed wheel
35 Fixed wheel
36 Shifting packet
37 Shifting packet
38 Fixed wheel
39 Fixed wheel
40 Intermediate wheel
41 Loose wheel
42 Loose wheel
43 Further drive output shaft of the splitter transmission, power take-off shaft
44 Loose wheel
45 Clutch bell

The invention claimed is:

1. A transmission arrangement which can be shifted under full load, the transmission arrangement comprising:
   a plurality of torque-transmitting branches being formed on a drive input side by alternatively shiftable gear stages of a splitter transmission, and, on a drive output side, by alternatively shiftable gear stages of a synchromesh transmission such that each of the torque-transmitting branches is defined by engaging a gear of the splitter transmission and by engaging a gear of the synchromesh transmission,
   the synchromesh transmission having first and second input shafts, the first input shaft of the synchromesh transmission in driving association with a first powershiftable element and the second input shaft of the synchromesh transmission in driving association with a second powershiftable element,
   the splitter transmission being designed as a powershiftable splitter transmission having a counter shaft and only one drive output shaft, the counter shaft and drive output shaft of the splitter transmission being aligned parallel to each other, and the first and the second powershiftable elements being arranged in a force flow direction after the splitter transmission but before the synchromesh transmission.

2. The transmission arrangement according to claim 1, wherein the splitter transmission is in driving connection with the first and the second powershiftable elements by way of the drive output shaft of the splitter transmission.

3. The transmission arrangement according to claim 1, wherein the transmission arrangement is designed such that the torque-transmitting branches, associated with the gears of the synchromesh transmission, are activated in accordance with a gear sequence of the synchromesh transmission in alternation, respectively, by one of the first and the second powershiftable elements.

4. The transmission arrangement according to claim 1, wherein the first and the second powershiftable elements are combined in a dual-clutch arrangement in which the first and the second input shafts of the synchromesh transmission are coaxially aligned.

5. The transmission arrangement according to claim 1, wherein the synchromesh transmission comprises at least one shifting packet, which combines shifting clutches of loose wheels of different gears of the synchromesh transmission arranged on a common shaft.

6. The transmission arrangement according to claim 1, wherein a first drive output of the synchromesh transmission is drivingly connectable with a drivable rear axle of a vehicle.

7. The transmission arrangement according to claim 6, wherein the first drive output is a bevel-gear drive such that the bevel-gear drive is drivingly connectable with a crown gear of the drivable rear axle.

8. The transmission arrangement according to claim 6, wherein a second drive output of the synchromesh transmission is engagable by a further powershiftable element.

9. The transmission arrangement according to claim 8, wherein the second drive output of the synchromesh transmission is drivingly connectable with a drivable front axle of a vehicle.

10. The transmission arrangement according to claim 8, wherein the synchromesh transmission is designed such that, by virtue of a gear ratio, the second drive output has a drive output rotational speed different from a drive output rotational speed of the first drive output.

11. The transmission arrangement according to claim 1, wherein the synchromesh transmission comprises at least one intermediate wheel which reverses a rotational direction of drive transmitted from the splitter transmission.

12. The transmission arrangement according to claim 1, further comprising at least one of a reversing transmission and a crawling gear gearset.

13. The transmission arrangement according to claim 1, wherein the splitter transmission has a further drive output shaft designed as a power take-off shaft.

14. The transmission arrangement according to claim 1, wherein the synchromesh transmission is designed such that at least two forward gears and one reverse gear are obtainable.

15. An agricultural working machine comprising a transmission arrangement which can be shifted under full load and having a plurality of torque-transmitting branches formed, on a drive input side, by alternatively shiftable gear stages of a splitter transmission and, on a drive output side, by alternatively shiftable gear stages of a synchromesh transmission, such that each of the torque-transmitting branches is defined by engaging a gear of the splitter transmission and by engaging a gear of the synchromesh transmission, the synchromesh transmission has two input shafts of the synchromesh transmission, each respectively in driving association with a powershiftable element, and
   the splitter transmission being designed as a powershiftable splitter transmission having a counter shaft and only one drive output shaft, the counter shaft and drive output shaft of the splitter transmission being aligned parallel to each other, and the powershiftable elements being arranged in a force flow direction after the splitter transmission but before the synchromesh transmission.

16. A transmission arrangement which is shiftable under full load, the transmission arrangement comprising:
   a plurality of torque-transmitting branches formed, on a drive input side of the transmission arrangement, by alternatively shiftable gear stages of a splitter transmission and, on a drive output side of the transmission arrangement, by alternatively shiftable gear stages of a synchromesh transmission, each of the plurality of torque-transmitting branches being defined by engaging a gear of the splitter transmission and by engaging a gear of the synchromesh transmission;

the synchromesh transmission having a first input shaft that is drivingly associated with a first powershiftable element, and a second input shaft that is drivingly associated with a second powershiftable element; and the splitter transmission is a powershiftable splitter transmission having a counter shaft and only one drive output shaft, the counter shaft and drive output shaft of the splitter transmission being aligned parallel to each other, and the first and the second powershiftable elements are arranged in a force flow direction after the splitter transmission and before the synchromesh transmission.

* * * * *